(12) United States Patent
Kakinuma et al.

(10) Patent No.: US 11,563,219 B2
(45) Date of Patent: *Jan. 24, 2023

(54) CARRIER POWDER, METHOD FOR PRODUCING SAME, CARRIER METAL CATALYST, AND METHOD FOR PRODUCING SAME

(71) Applicant: UNIVERSITY OF YAMANASHI, Kofu (JP)

(72) Inventors: Katsuyoshi Kakinuma, Kofu (JP); Makoto Uchida, Kofu (JP); Akihiro Iiyama, Kofu (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 326 days.

This patent is subject to a terminal disclaimer.

(21) Appl. No.: 16/632,657

(22) PCT Filed: Jul. 18, 2018

(86) PCT No.: PCT/JP2018/026888
§ 371 (c)(1),
(2) Date: Jan. 21, 2020

(87) PCT Pub. No.: WO2019/021904
PCT Pub. Date: Jan. 31, 2019

(65) Prior Publication Data
US 2020/0164349 A1 May 28, 2020

(30) Foreign Application Priority Data

Jul. 25, 2017 (JP) .............................. JP2017-143567

(51) Int. Cl.
*B01J 21/06* (2006.01)
*B01J 23/89* (2006.01)
(Continued)

(52) U.S. Cl.
CPC .......... *H01M 4/9075* (2013.01); *B01J 23/89* (2013.01); *B01J 37/08* (2013.01); *B01J 37/16* (2013.01); *H01M 4/921* (2013.01)

(58) Field of Classification Search
CPC . B01J 21/063; B01J 23/89; B01J 37/08; B01J 37/16; H01M 4/9075; H01M 4/921
(Continued)

(56) References Cited

U.S. PATENT DOCUMENTS 3,288,723 A * 11/1966 Heymer ................... C01G 1/00
423/495
8,415,267 B2 * 4/2013 Lee .......................... B01J 23/52
977/773

(Continued)

FOREIGN PATENT DOCUMENTS

| JP | 10-174864 A | 6/1998 |
| JP | 2006-210135 A | 8/2006 |

(Continued)

OTHER PUBLICATIONS

International Search Report dated Sep. 11, 2018 in corresponding International Application No. PCT/JP2018/026888; 2 pgs.
(Continued)

*Primary Examiner* — Cam N. Nguyen
(74) *Attorney, Agent, or Firm* — Maier & Maier, PLLC

(57) ABSTRACT

A carrier powder is thermodynamically stable and conductivity can be easily provided thereto. A carrier powder includes an aggregate of carrier fine particles; wherein: the carrier fine particles include a chained portion structured by fusion bonding a plurality of crystallites into a chain; the carrier fine particles contain titanium oxide; and a ratio of anatase phase/rutile phase of the titanium oxide of the carrier powder is 0.2 or lower.

17 Claims, 17 Drawing Sheets

(51) Int. Cl.
  *B01J 37/08* (2006.01)
  *B01J 37/16* (2006.01)
  *H01M 4/90* (2006.01)
  *H01M 4/92* (2006.01)

(58) Field of Classification Search
  USPC .................................................. 502/339, 350
  See application file for complete search history.

(56) References Cited

U.S. PATENT DOCUMENTS

| | | | | |
|---|---|---|---|---|
| 9,608,278 | B2* | 3/2017 | Hayden | H01M 4/925 |
| 9,837,668 | B2* | 12/2017 | Cerri | B01J 23/6484 |
| 10,431,831 | B2* | 10/2019 | Sakai | B01J 35/006 |
| 10,693,146 | B2* | 6/2020 | Watanabe | B22F 9/22 |
| 2012/0295184 | A1 | 11/2012 | Watanabe et al. | |
| 2017/0250409 | A1 | 8/2017 | Kakinuma | |
| 2018/0175397 | A1 | 6/2018 | Shintani et al. | |

FOREIGN PATENT DOCUMENTS

| | | |
|---|---|---|
| JP | 2008-077999 A | 4/2008 |
| JP | 2017-042759 A | 3/2017 |
| JP | 2017-157353 A | 9/2017 |
| WO | 2011/065471 A1 | 6/2011 |
| WO | 2016/203679 A1 | 12/2016 |

OTHER PUBLICATIONS

International Preliminary Report on Patentability dated Mar. 28, 2019 in corresponding International Application No. PCT/JP2018/026888; 11 pgs.

* cited by examiner

Carrier Metal Catalyst 100 of Example 1

Carrier Metal Catalyst 100 of Example 2

Fig. 15A: TEM image after accelerated durability test
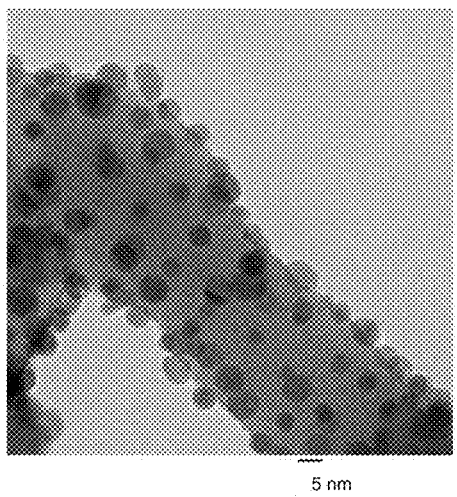
Fig. 15B
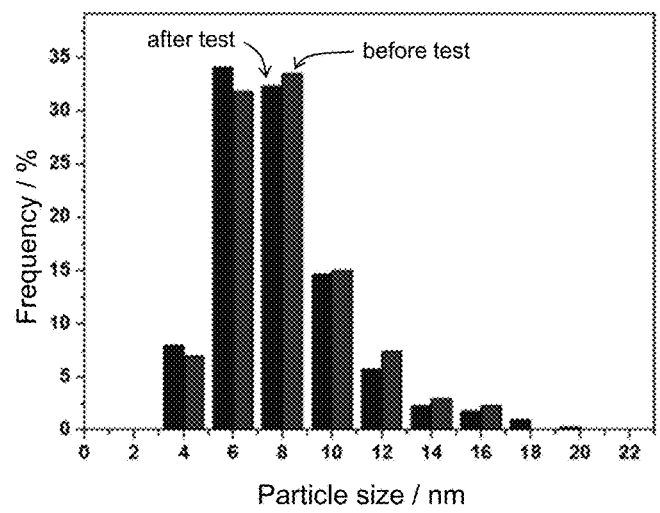

CARRIER POWDER, METHOD FOR PRODUCING SAME, CARRIER METAL CATALYST, AND METHOD FOR PRODUCING SAME

TECHNICAL FIELD

The present invention relates to a carrier powder and a manufacturing method thereof, and to a carrier metal catalyst and a manufacturing method thereof. The carrier metal catalyst of the present invention is suitably used as a cathode electrode catalyst of a fuel cell.

BACKGROUND

Patent Literature 1 discloses a metal oxide primary particle fusant having a chained or tufted structure, which is superior as a carrier for electrode catalyst of a solid polymer electrolyte fuel cell. Example 3 of Patent Literature 1 discloses a solution prepared by dissolving titanium octylate and niobium octylate in mineral turpentine, which is made into a mist and introduced in a chemical flame, thereby generating niobium-doped titanium oxide.

CITATION LIST

Patent Literature

Patent Literature 1: WO 2011/065471

SUMMARY OF THE INVENTION

Technical Problem

FIG. 13 of Patent Literature 1 shows XRD pattern of the titanium oxide of Example 3 in Patent Literature 1. It can be understood that the titanium oxide is structured almost only from anatase phase. Compared with the rutile phase, the anatase phase is thermodynamically unstable and lower in conductivity. However, with the manufacturing method disclosed in Patent Literature 1, titanium oxide structured with almost only from anatase phase is generated, and titanium oxide having rutile phase as a major phase cannot be manufactured.

The present invention has been made by taking the afore-mentioned circumstances into consideration. An object of the present invention is to provide a carrier powder which is thermodynamically stable and is easy to be provided with conductivity.

Solution to Problem

According to the present invention, a carrier powder comprising an aggregate of carrier fine particles; wherein: the carrier fine particles comprise a chained portion structured by fusion bonding a plurality of crystallites into a chain; the carrier fine particles contain titanium oxide; and a ratio of anatase phase/rutile phase of the titanium oxide of the carrier powder is 0.2 or lower, is provided.

The carrier powder of the present invention is an aggregate of carrier fine particles, and the ratio of anatase phase/rutile phase of the titanium oxide contained in the carrier powder is 0.2 or lower. Accordingly, the carrier powder of the present invention is thermodynamically stable, and is easy to be provided with conductivity. Further, the carrier fine particles of the present invention comprise a chained portion structured by fusion bonding a plurality of crystallites into a chain. Therefore, the carrier powder of the present invention has a large specific surface area. Accordingly, the carrier fine particles of the present invention can be suitably used as a carrier for carrier metal catalyst. In addition, usage of such carrier metal catalyst, enables manufacture of a solid polymer electrolyte fuel cell which is low in cost, has high durability and catalytic activity, and can achieve long term stable operation and widespread of the solid polymer electrolyte fuel cell.

BRIEF DESCRIPTION OF THE DRAWINGS

FIG. 15A is a TEM image of carrier metal catalyst 100 of Example 1 after accelerated durability test.

FIG. 15B is a particle size distribution of metal fine particles 130 of carrier metal catalyst 100 of Example 1, before and after accelerated durability test.

BEST MODE FOR CARRYING OUT THE INVENTION

Hereinafter, embodiments of the present invention will be explained with reference to the drawings. Various distinctive features shown in the following embodiments can be combined with each other. In addition, an invention can be established independently for each of the distinctive features.

1. Carrier Metal Catalyst 100

As shown in FIGS. 1 to 4, the carrier metal catalyst 100 comprises a carrier powder which is an aggregate of carrier fine particles having a chained portion structured by fusion bonding a plurality of crystallites 120 into a chain, and metal fine particles 130 being supported on the carrier powder. The ratio of anatase phase/rutile phase of the titanium oxide contained in the carrier powder is 0.2 or lower. Hereinafter, each of the constituents will be explained.

1-1. Carrier Fine Particles 150 and Carrier Powder

Figure 1:
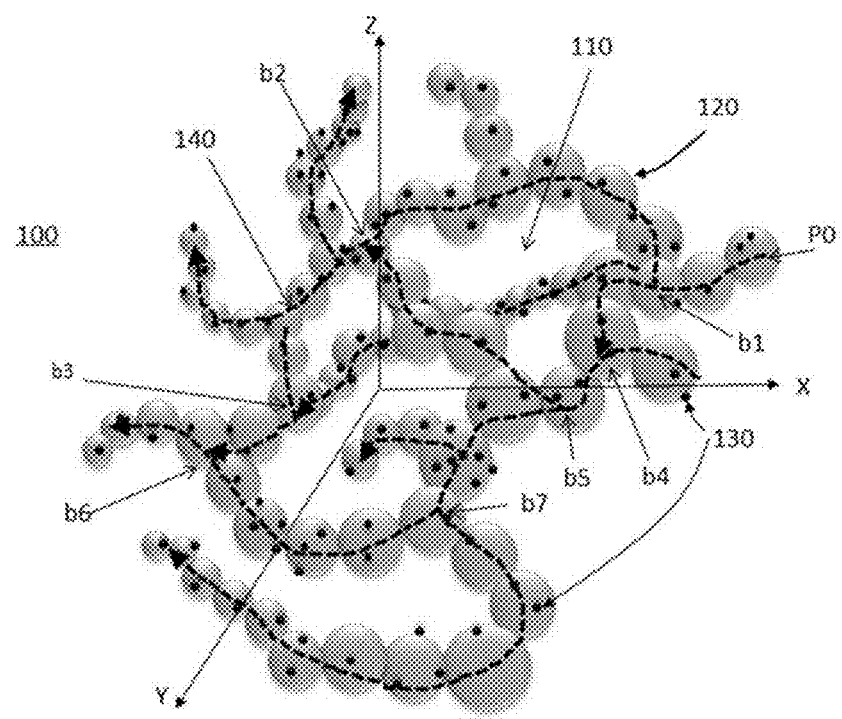
FIG. 1 is a model diagram of a catalyst structure of carrier metal catalyst 100.

As shown in FIG. 1, in the carrier fine particles 150, a three-dimensional gap 110 surrounded by the branch 160 and pores existing between a plurality of branches is formed. Here, a plurality of crystallites 120 structuring the carrier fine particles 150 is fusion bonded to form a chained portion, thereby forming the branch 160. Gas diffusion route to diffuse and transfer oxygen as the oxidant and/or hydrogen as the fuel to the carrier metal catalyst 100 is formed by the three-dimensional arrangement of the carrier fine particles 150 described above.

Figure 2:
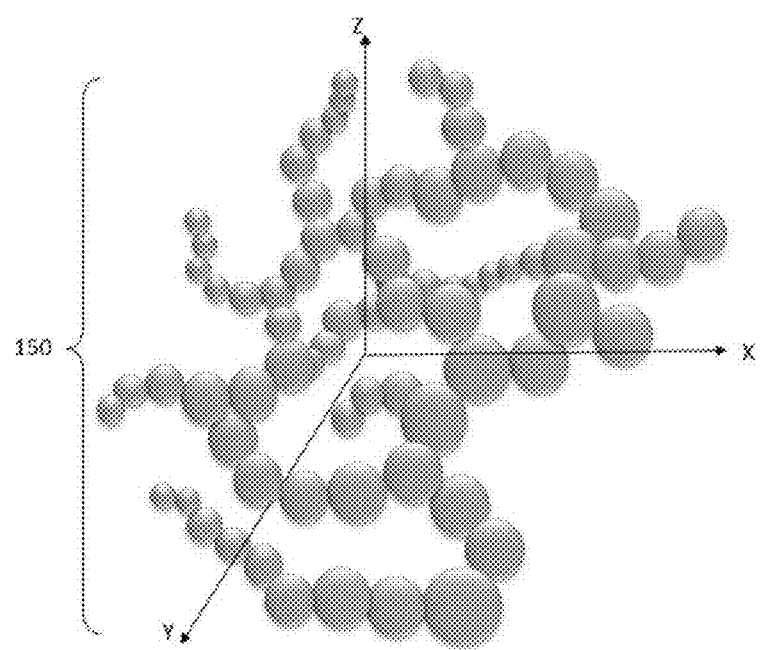
FIG. 2 shows a view in which carrier fine particles 150 are taken from FIG. 1.
Figure 3:
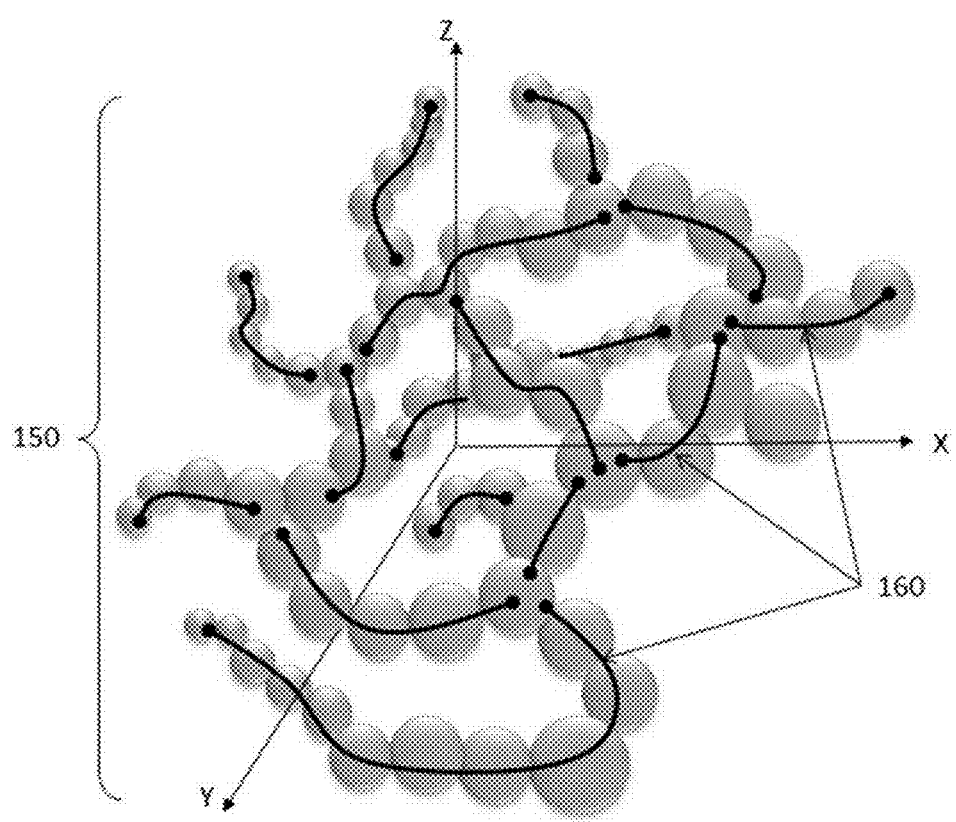
FIG. 3 shows a condition of branch 160 of the carrier fine particles 150 of FIG. 1.
Figure 4:
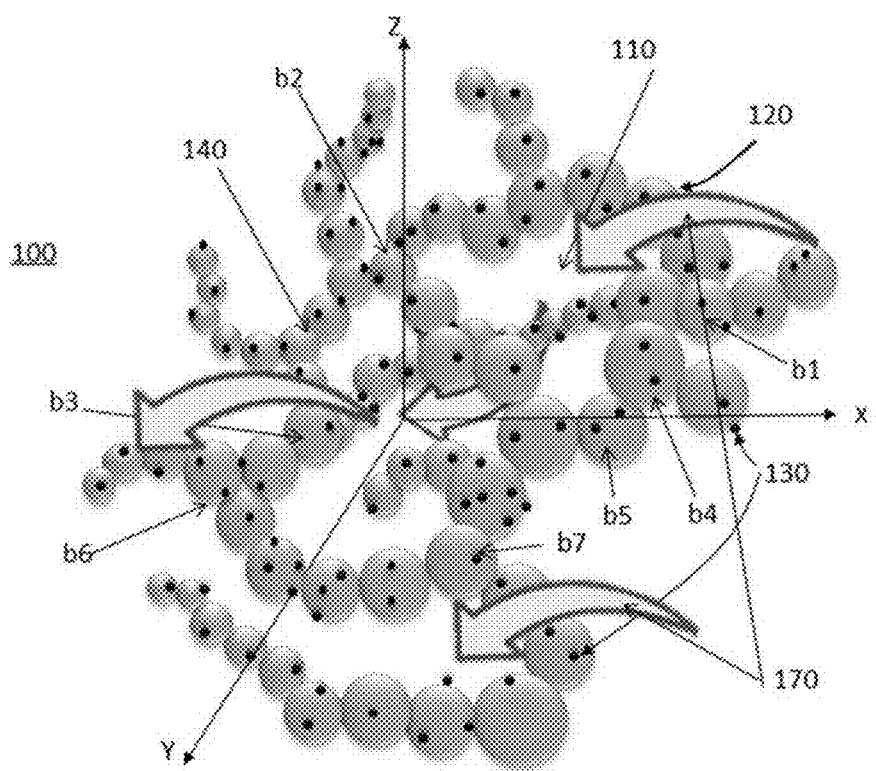
FIG. 4 shows a gas diffusion path of FIG. 1.

As shown in FIGS. 1 to 3 as an example of structure model of the carrier metal catalyst, the carrier fine particles 150 comprise four pores of a first pore surrounded by points b1, b2, b5, b4, and b1, where the branches link with each other (may be referred to as branching points, or merely as branch); a second pore surrounded by branching points b1, b2, b3, and b1; a third pore surrounded by branching points b2, b3, b6, b7, b5, and b2; and a fourth pore surrounded by branching points b1, b3, b6, b7, b5, b4, and b1. Here, when a plane surrounded by the branching points of each of the pores (first to fourth pores) is taken as the pore plane, the gap 110 is a three-dimensional space surrounded by the four pore planes. The carrier fine particles 150 comprise a plurality of pores surrounded by a plurality of branching points in which a plurality of branches link with each other. Further, the three-dimensional spaces (gaps) which are surrounded by the plurality of pores are provided sequentially, thereby structuring the carrier fine particles. Accordingly, the gap serves as the gas diffusion route (gas diffusion path) of oxygen, hydrogen and the like. FIG. 4 shows the gas diffusion route in FIG. 1. In FIG. 4, one example of the gas diffusion route (gas diffusion path) of gap 110 is shown. Flow (gas diffusion route) 170 of oxidant (gas), fuel gas and the like can flow in the desired direction via the gap 110 as shown in FIG. 4. That is, the gap 110 serves as the gas diffusion route.

Here, as simple structure of the carrier fine particles 150, the carrier fine particles can have only one pore (for example, the first pore surrounded by the branching points b1, b2, b5, b4, and b1). In such case, a gap 110 having a thickness of the crystallite grain of the crystallite 120 is provided. As a more simple structure, the carrier fine particles 150 can have one or more branches. In such case, the branches within the carrier fine particles 150 prohibits cohesion of the crystallites, thereby providing gap 110 between the crystallites.

Here, the "pore" mentioned above can also be mentioned as closed curve (closed loop). Otherwise, it can be said that a gap 110 surrounded by a closed plane including the afore-mentioned plurality of branching points (for example, branching points b1 to b7) is provided. As the branching points b1 to b7, the center of gravity of the crystallite of the metal oxide structuring the carrier fine particles 150 in which the branches connect with each other can be taken as the branching point, or an arbitrary point in the crystallite can be taken as the branching point.

The size of the crystallite 120 is preferably 1 to 30 nm, more preferably 5 to 15 nm. The size is, particularly for example, 1, 5, 10, 15, 20, 25, and 30 nm, and can be in the range between the two values exemplified herein. The size of the crystallite 120 (crystallite diameter) can be obtained in accordance with a Sheller formula using half-width in the XRD pattern peak.

The aggregate of the carrier fine particles 150 is in the form of a powder. Such aggregate is referred to as "carrier powder".

The mean particle size of the carrier fine particles 150 in the carrier powder is in the range of 0.1 µm to 4 µm, preferably in the range of 0.5 µm to 2 µm. The mean particle size of the carrier fine particles 150 can be measured with a laser diffraction/scattering particle size distribution analyzer.

The specific surface area of the carrier powder is preferably 12 $m^2/g$ or more, and is more preferably 25 $m^2/g$ or more. The specific surface area is, for example, 12 to 100 $m^2/g$, particularly for example, 12, 15, 20, 25, 30, 35, 40, 45, 50, or 100 $m^2/g$, and can be in the range between the two values exemplified herein.

Figure 5:
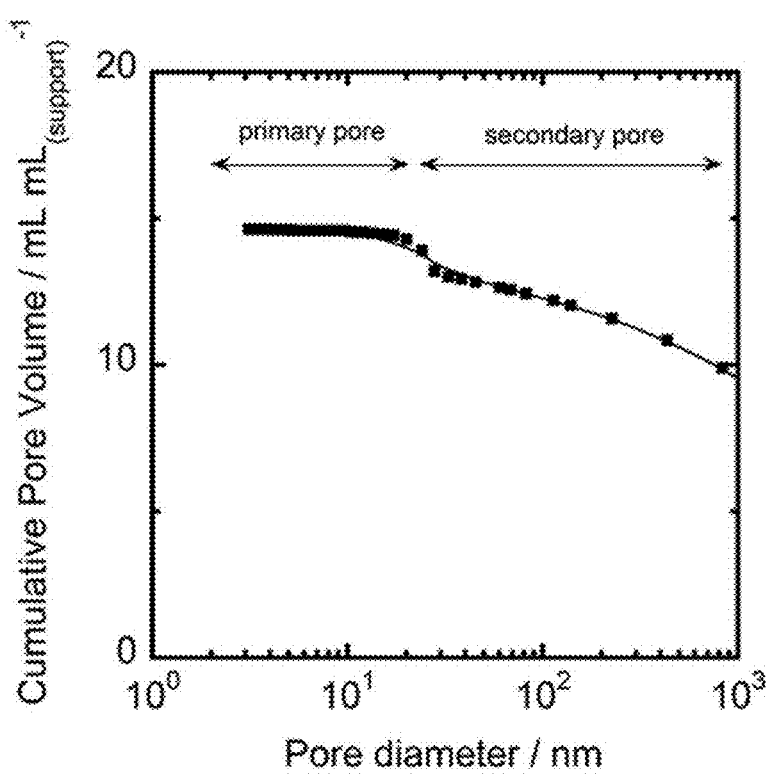
FIG. 5 shows one example of a distribution of gaps 110 contained in the carrier powder.

On example of the distribution of gap 110 contained in the carrier powder is shown in FIG. 5. Distribution of gap 110 can be obtained by measuring the volume of the three-dimensional gap of the carrier powder, using a mercury porosimetry. In FIG. 5, volume per one gap is obtained from the measured value of the volume and the number of the gaps, and then a diameter of a sphere is obtained by converting the volume obtained into a volume of a sphere (sphere equivalent diameter obtained by mercury press-in method). FIG. 5 shows a cumulative size distribution of the diameter of the sphere. As shown in FIG. 5, the carrier powder preferably has a gap of 11 nm or less (primary pore) and a gap of larger than 11 nm (secondary pore). As such, gas diffusion route in the catalyst layer of the fuel cell can be provided.

The carrier powder preferably has a porosity of 50% or more, and more preferably a porosity of 60% or more. The porosity is, for example, 50 to 80%, particularly for example, 50, 55, 60, 65, 70, 75, or 80%, and can be in the range between the two values exemplified herein. Porosity can be obtained by mercury press-in method or by FIB-SEM.

The carrier powder preferably has a repose angle of 50 degrees or less, and more preferably a repose angle of 45 degrees or less. In such case, the carrier powder has a similar flowability as flour, and thus handling is simple. The repose angle is, for example, 20 to 50 degrees, particularly for example, 20, 25, 30, 35, 40, 45, or 50, and can be in the range between the two values exemplified herein. The repose angle can be obtained by drop volume method.

The carrier fine particles 150 are preferably doped with an element having a valence different from the valence of titanium. As the element having a valence different from the valence of titanium, at least one is selected from rare earth element represented by yttrium, group 5 element represented by niobium and tantalum, group 6 element represented by tungsten, and group 15 element represented by antimony. By doping with such element, the carrier fine particles can be provided with conductivity. Among such elements, group 5 element represented by niobium and tantalum, and group 6 element represented by tungsten are preferable, and tantalum and tungsten are especially preferable. Tantalum and tungsten are especially preferable due to their large solid solubility limit. Here, when non-doped, anatase phase of titanium oxide can be converted into rutile phase by heat treatment at approximately 500° C. On the other hand, replacement by solid solution of the dopant can raise the phase conversion temperature to 1000° C. or higher. Accordingly, when titanium oxide of carrier fine particles 150 contains a dopant, manufacture of the carrier fine particles 150 and carrier powder by the method described in "3. Method for Manufacturing Carrier Powder" would be especially meaningful.

Conductivity of the carrier powder is preferably 0.001 S/cm or higher, and is more preferably 0.01 S/cm or higher. The conductivity is, for example, 0.01 to 1000 S/cm, particularly for example, 0.01, 0.1, 1, 10, 100, or 1000 S/cm, and can be in the range between the two values exemplified herein. Conductivity can be measured in accordance with the JIS standard (JIS K 7194).

The carrier fine particles 150 have a branch 160 comprising a chained portion which is structured by fusion bonding a plurality of crystallites 120 into a chain. The branch 160 itself has a nature to allow electrons to flow. As shown in FIGS. 1 to 4, the carrier fine particles 150 have a plurality of branches 160, and the branches connect with each other at branching points (b1 to b7), by which a network is structured. Electrons flow among the branches, thereby providing electrical conductivity. Accordingly, the branches 160 of the carrier fine particles 150 shown by the dotted line from point PO in FIG. 1 itself structures an electron conduction route (electron conduction path) 140.

In the present embodiment, the carrier fine particles 150 include titanium oxide, and the ratio of the titanium oxide contained in the metal oxide in the carrier fine particles 150 is preferably 50 mol % or more. This ratio is, particularly for example, 50, 60, 70, 80, 90, 95, or 100 mol %, and can be in the range between the two values exemplified herein.

The ratio of anatase phase/rutile phase of the titanium oxide in the carrier powder is 0.2 or lower. In such case, the characteristics of the rutile phase would appear strongly, resulting in higher thermodynamic stability and it becomes easier to provide conductivity when doped. The ratio is, particularly for example, 0, 0.05, 0.1, 0.15, or 0.2, and can be in the range between the two values exemplified herein. The ratio can be obtained by (peak intensity at 2θ=25.16 degrees)/(peak intensity at 2θ=27.24 degrees) in the XRD pattern. This is since the peaks at 2θ=25.16 degrees and 2θ=27.24 degrees are peaks derived from the presence of the anatase phase and the rutile phase, respectively.

1-2. Metal Fine Particles 130

The metal fine particles 130 are fine particles of metal or alloy which can function as a catalyst. The mean particle size of the plurality of metal fine particles 130 supported on the carrier powder is preferably 1 to 20 nm, more preferably 3 to 10 nm. The mean particle size is, particularly for example, 1, 2, 3, 4, 5, 6, 7, 8, 9, 10, 11, 12, 13, 14, 15, 16, 17, 18, 19, or 20 nm, and can be in the range between the two values exemplified herein. When the mean particle size of the metal fine particles 130 is smaller than 1 nm, the metal fine particles would dissolve along with the progress of the electrode reaction. On the other hand, when the mean particle size of the metal fine particles 130 is larger than 20 nm, the electrochemical active area would become small, and thus the desired electrode property cannot be achieved. The mean particle size of the metal fine particles 130 can be obtained by measuring the diameter of the circumscribed circle of all the metal fine particles 130 in the TEM image of the carrier metal catalyst 100 (such as those shown in FIG. 6A and FIG. 6C), and then calculating the arithmetic mean of the measured diameter.

The metal fine particles 130 preferably comprise a core, and a skin layer covering the core. The core preferably comprises an alloy of a noble metal and a transition metal. The skin layer preferably comprises a noble metal. As the noble metal, platinum is preferable. As the transition metal, cobalt (Co) or nickel (Ni) are preferable, and cobalt is especially suitable.

The metal fine particles 130 preferably contain titanium as a solid solution, and the amount of titanium dissolved in the core is preferably larger than the amount of titanium dissolved in the skin layer. As such, when titanium is dissolved more in the core, activity of the core can be improved.

The amount of the metal fine particles being supported is preferably 1 to 50 mass %, more preferably 5 to 25 mass %. The amount being supported is, particularly for example, 1, 5, 10, 15, 20, 25, 30, 35, 40, 45, or 50 mass %, and can be in the range between the two values exemplified herein.

The electrochemical active area of the carrier metal catalyst 100 is preferably 20 m$^2$/g or more. This are is, for example, 20 to 200 m$^2$/g, and is, particularly for example, 20, 30, 40, 50, 60, 70, 80, 90, 100, 110, 120, 130, 140, 150, 160, 170, 180, 190, or 200 m$^2$/g, and can be in the range between the two values exemplified herein. The electrochemical active area can be obtained by cyclic voltammetry.

2. Fuel Cell 200

Figure 7:
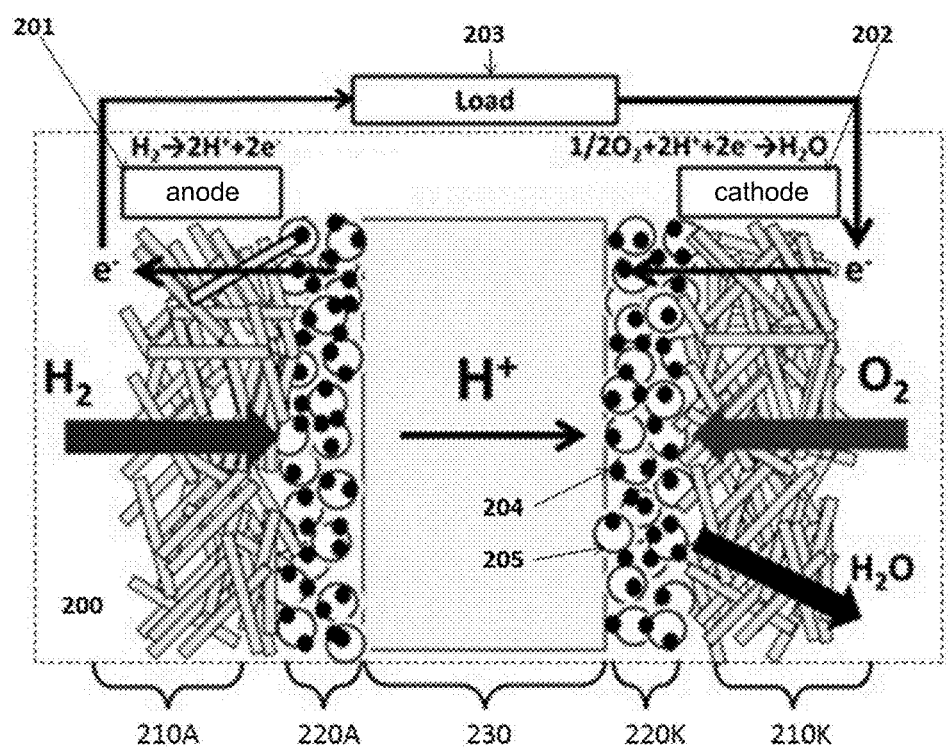
FIG. 7 is a model diagram of a fuel cell.
Figure 8:
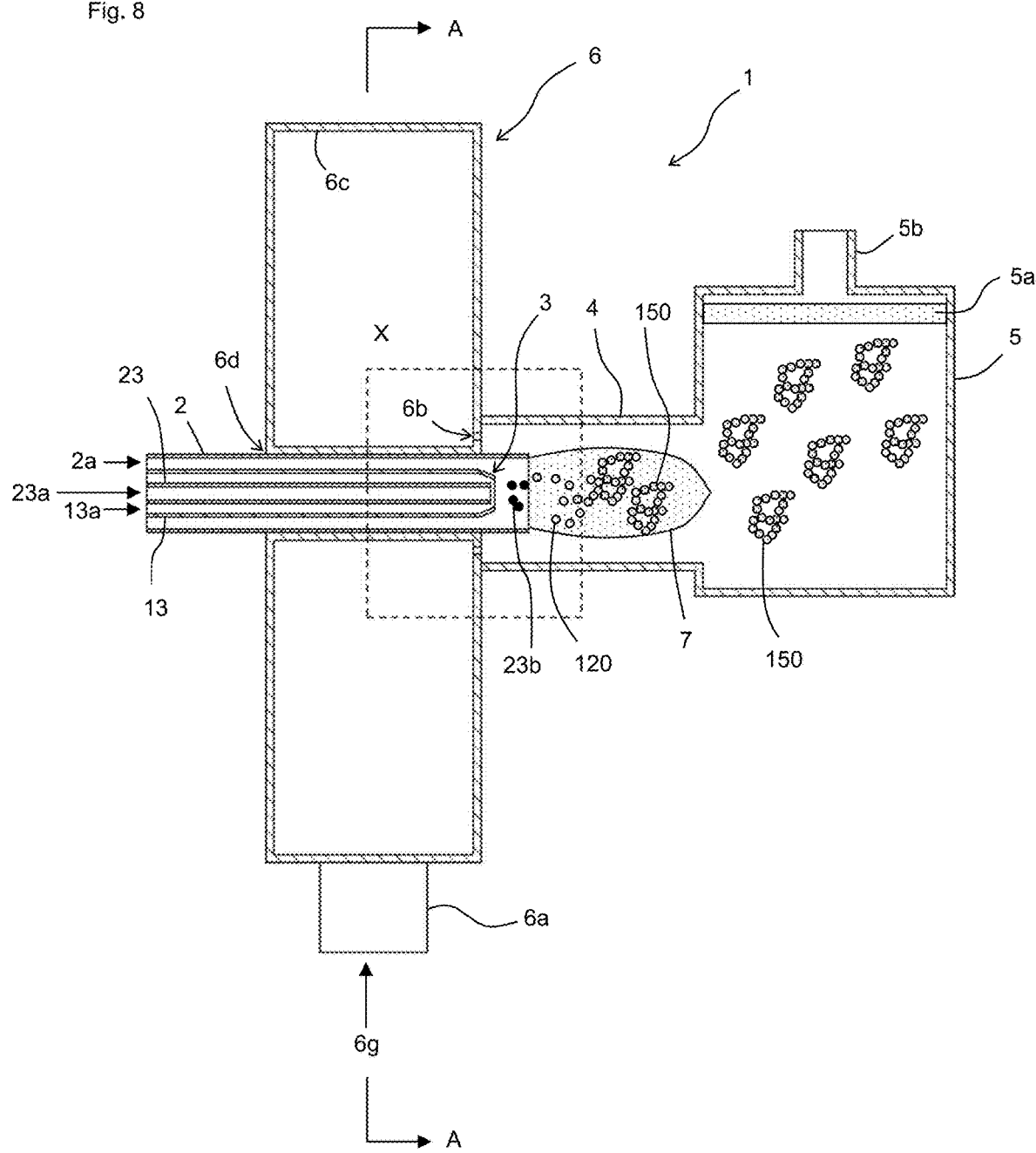
FIG. 8 is a sectional view which is cut through the center of burner 2 of a manufacturing apparatus 1 for manufacturing the carrier powder.
Figure 9:
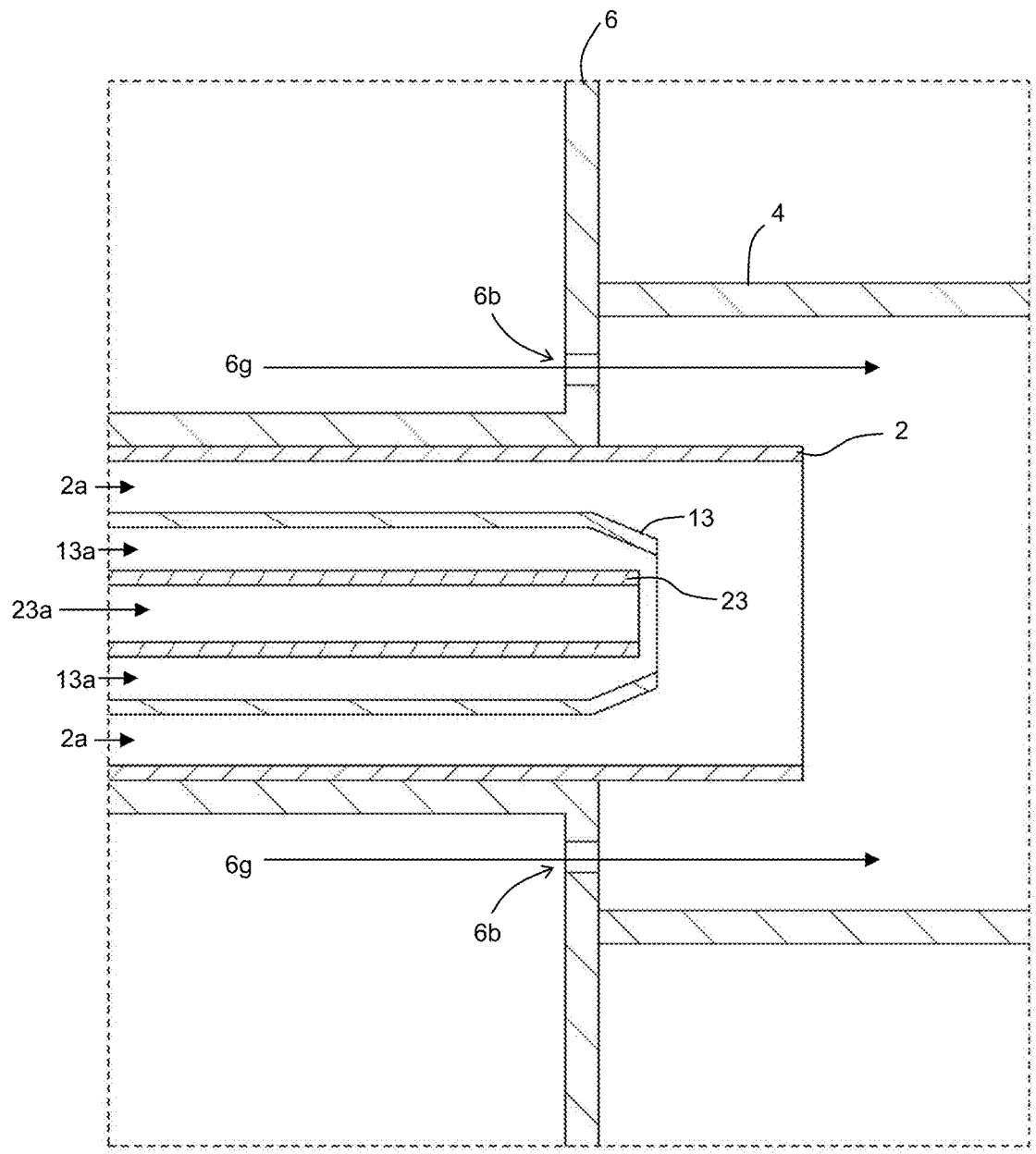
FIG. 9 is an enlarged view of region X in FIG. 8.
Figure 10:
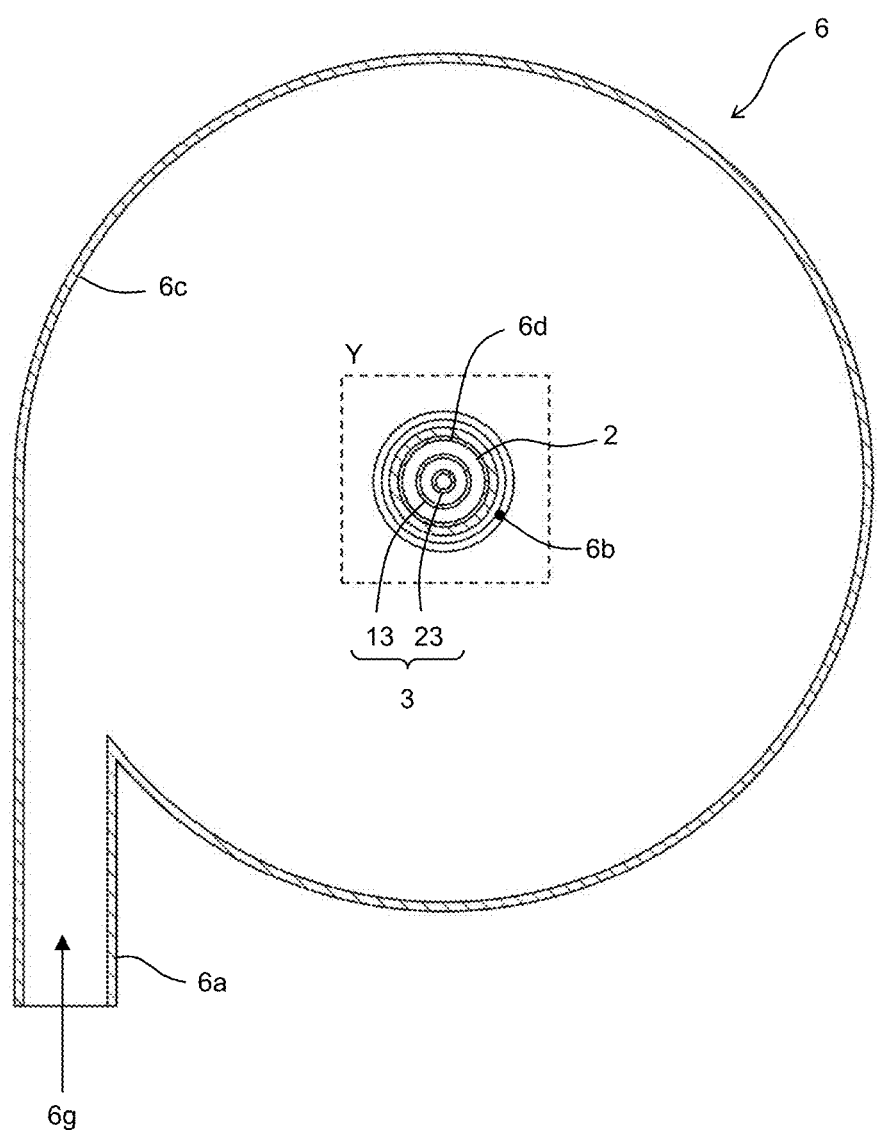
FIG. 10 is a sectional view taken along the line A-A of FIG. 8.
Figure 11:
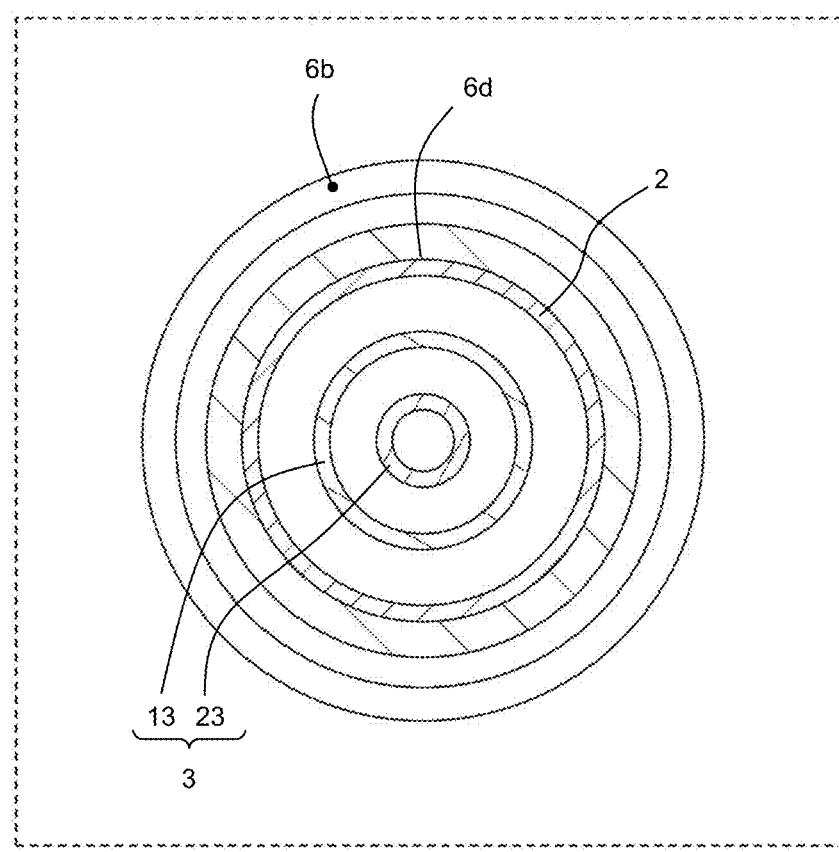
FIG. 11 is an enlarged view of region Y in FIG. 10.

A model diagram of the fuel cell according to the present invention is shown in FIG. 7. In FIG. 7, the fuel cell (cell of fuel cell) 200 is structured by aligning the catalyst layer 220A and the gas diffusion layer 210A on the anode 201 side, and the catalyst layer 220K and the gas diffusion layer 210K on the cathode 202 side, facing each other with the electrolyte membrane 230 in between. That is, the gas diffusion layer 210A on the anode side, the catalyst layer 220A on the anode side, the electrolyte membrane 230, the catalyst layer 220K on the cathode side, and the gas diffusion layer 210K on the cathode side are aligned in this order. The catalyst layer 220A on the anode side contains the carrier metal catalyst 100. The catalyst layer 220A on the anode side can contain the carrier metal catalyst 100, or can contain a carrier metal catalyst which contains tin oxide in place of titanium oxide. By connecting the load 203 in between the anode 201 and the cathode 202 of the solid polymer electrolyte fuel cell 200, power is output to the load 203.

3. Method for Manufacturing Carrier Powder

First, referring to FIG. 8 to FIG. 11, the manufacturing apparatus 1 which can be used for the manufacture of the carrier powder is explained. The manufacturing apparatus 1 comprises a burner 2, a raw material supplying unit 3, a reaction cylinder 4, a collector 5, and a gas reservoir 6. The raw material supplying unit 3 comprises an outer cylinder 13, and a raw material distribution cylinder 23.

The burner 2 is a cylinder, and the raw material supplying unit 3 is arranged in the burner 2. Burner gas 2a is distributed between the burner 2 and the outer cylinder 13. The burner gas 2a is used to form a flame 7 at the tip of the burner 2 by ignition. A high temperature region having a temperature of 1000° C. or higher is formed by the flame 7. The burner gas 2a preferably contains a combustible gas such as propane, methane, acetylene, hydrogen, or nitrous oxide. In one example, a gas mixture of oxygen and propane can be used as the burner gas 2a. The temperature of the high temperature region is 1000 to 2000° C. for example, and is particularly for example, 1000, 1100, 1200, 1300, 1400, 1500, 1600, 1700, 1800, 1900, or 2000° C., and can be in the range between the two values exemplified herein.

A raw material solution 23a for generating the carrier powder is distributed in the raw material distribution cylinder 23. As the raw material solution 23a, the one containing a titanium compound is used. As the titanium compound, fatty acid titanium can be mentioned for example. The number of carbon atoms in the fatty acid is, for example, 2 to 20, preferably 4 to 15, and further preferably 6 to 12. As the fatty acid titanium, titanium octylate is preferable. The raw material solution 23a can contain a metal compound for doping the carrier fine particles 150. As the metal compound, fatty acid metal (Nb, Ta, W and the like) salt can be mentioned for example. The number of carbon atoms in the fatty acid is, for example, 2 to 20, preferably 4 to 15, and further preferably 6 to 12. As the fatty acid metal salt, niobium octylate, tantalum octylate, and tungsten octylate are preferable. The molar ratio of titanium compound:metal compound is arbitrarily determined to improve the conductivity of the carrier powder. Here, the molar ratio is preferably 0.8:0.2 to 0.99:0.01.

In the raw material solution 23a, the titanium compound is preferably dissolved or dispersed in a non-aqueous solvent. As the non-aqueous solvent, organic solvent represented by tarpen can be mentioned. When moisture is contained in the raw material solution 23a, the fatty acid titanium can undergo hydrolysis and deteriorate. To prevent hydrolysis of the fatty acid titanium, the water content of the raw material solution 23a is preferably 100 ppm or lower, and more preferably 50 ppm or lower. By preventing hydrolysis of fatty acid titanium, ratio of the rutile phase in the titanium oxide can be improved.

Mist gas 13a used for converting the raw material solution 23a into a mist is distributed in between the outer cylinder 13 and the raw material distribution cylinder 23. When the mist gas 13a and the raw material solution 23a are jetted together from the tip of the raw material supplying unit 3, the raw material solution 23a is converted into a mist. The mist 23b of the raw material solution 23a is sprayed into the flame 7, and the titanium compound in the raw material solution 23a undergoes a thermal decomposition reaction in the flame 7. Accordingly, carrier powder which is an aggregate of carrier fine particles 150 having a chained portion structured by fusion bonding the crystallite 120 into a chain is generated. The mist gas 13a is oxygen in one example.

The reaction cylinder 4 is provided between the collector 5 and the gas reservoir 6. The flame 7 is formed in the reaction cylinder 4. The collector 5 is provided with a filter 5a and a gas discharging portion 5b. A negative pressure is applied to the gas discharging portion 5b. Accordingly, a flow which flows towards the gas discharging portion 5b is generated in the collector 5 and the reaction cylinder 4.

The gas reservoir 6 has a cylinder shape, and comprises a cold gas introducing portion 6a and a slit 6b. A cold gas 6g is introduced from the cold gas introducing portion 6a into the gas reservoir 6. The cold gas introducing portion 6a is directed in a direction along the tangential line of the inner peripheral wall 6c of the gas reservoir 6. Therefore, the cold gas 6g introduced through the cold gas introducing portion 6a into the gas reservoir 6 revolves along the inner peripheral wall 6c. At the center of the gas reservoir 6, a burner insertion hole 6d is provided. The burner 2 is inserted through the burner insertion hole 6d. The slit 6b is provided in the vicinity of the burner insertion hole 6d so as to surround the burner insertion hole 6d. Accordingly, when the burner 2 is inserted through the burner insertion hole 6d, the slit 6b is provided so as to surround the burner 2. The cold gas 6g in the gas reservoir 6 is driven by the negative pressure applied to the gas discharging portion 5b, and is discharged from the slit 6b towards the reaction cylinder 4. The cold gas 6g can be any gas so long as it can cool the titanium oxide generated, and is preferably an inert gas, and the cold gas 6g is, for example, air. The flow speed of the cold gas 6g is preferably two times or more of the flow speed of the burner gas 2a. The upper limit of the flow speed of the cold gas 6g is not particularly limited, and is 1000 times the flow speed of the burner gas 2a for example. The ratio of flow speed of cold gas 6g/flow speed of burner gas 2a is 2 to 1000 for example, and the ratio is particularly for example, 2, 5, 10, 15, 20, 25, 30, 35, 40, 45, 50, 100, 200, 500, or 1000, and can be in the range between the two values exemplified herein. Here, in the present embodiment, a negative pressure is applied to the gas discharging portion 5b to allow the cold gas 6g to flow, however, a positive pressure can be applied to the gas introducing portion 6a to allow the cold gas 6g to flow.

In Patent Literature 1, the gas reservoir 6 is not provided, and thus the outer air directly flows into the reaction cylinder from the gap between the burner and the reaction cylinder. Therefore, the outer air would turn into a turbulent flow in the reaction cylinder, thereby scattering mist, crystallite and carrier fine particles. Therefore, they cannot be sufficiently heated by the flame, thereby resulting in generation of titanium oxide having high ratio of anatase phase which is a metastable phase. On the other hand, in the present invention, the cold gas 6g is supplied in the surroundings of the flame 7 through the slit 6b, and thus the cold gas 6g flow around the flame 7 as a laminar air flow. Therefore, the mist 23b, crystallite 120, and the carrier fine particles 150 would not be scattered by the cold gas 6g, allowing them to move along the flame 7 and be heated sufficiently to progress the reaction. Accordingly, the ratio of the rutile phase of the titanium oxide in the carrier fine particles 150 can be increased. In addition, after the carrier fine particles 150 come out of the flame 7, the carrier fine particles 150 would be immediately cooled by the cold gas 6g, thereby allowing to maintain the structure having the chained portion. The carrier fine particles 150 after cooling would be trapped by the filter 5a and collected.

In the present invention, the carrier powder which is an aggregate of the carrier fine particles 150 can be manufactured by using the manufacturing apparatus 1. Here, a high-temperature region of 1000° C. or higher is formed at the tip of the burner 2 by the flame 7, and the titanium compound is allowed to undergo a thermal decomposition reaction in this high-temperature region while supplying the cold gas 6g through the slit 6b to the surroundings of the high-temperature region. The high-temperature region can be formed by plasma instead of the flame 7.

4. Method for Manufacturing Carrier Metal Catalyst 100

The method for manufacturing carrier metal catalyst 100 comprises a supporting step and a reduction step.

<Supporting Step>

In the supporting step, the metal fine particles 130 are supported on the carrier powder. Such supporting can be performed by a reverse micelle method, a colloidal method, an impregnation method and the like. In the colloidal method, the supporting step comprises an adsorption step and a heat treatment step.

In the adsorption step, the metal colloidal particles are adsorbed onto the carrier powder. More particularly, the metal colloidal particles synthesized by the colloidal method is dispersed in an aqueous solution to prepare a dispersion, and then the metal colloidal particles are added and mixed in the dispersion. Accordingly, the colloidal particles are adsorped onto the surface of the carrier powder. The carrier powder having the colloidal particles adsorbed thereon is then filtered and dried, thereby being separated from the dispersion medium.

In the heat treatment step, the metal colloidal particles are subjected to a heat treatment at 800° C. or higher after the adsorption step, thereby converting the metal colloidal particles into the metal fine particles 130. The heat treatment is preferably performed at 850, 900, or 950° C. or higher. The upper limit of the temperature is not particularly limited, and is, for example, 1500° C. The temperature is, particularly for example, 850, 900, 950, 1000, 1050, 1100, 1150, 1200, 1250, 1300, 1350, 1400, 1450, or 1500° C., and can be in the range between the two values exemplified herein.

The heat treatment time is, for example, 0.1 to 20 hours, preferably 0.5 to 5 hours. The heat treatment time is, particularly for example, 0.1, 0.5, 1, 2, 3, 4, 5, 6, 7, 8, 9, 10, 15, or 20 hours, and can be in the range between the two values exemplified herein.

Heat treatment can be carried out under an inert gas atmosphere such as nitrogen, or under an inert gas atmosphere containing 1 to 4% of hydrogen.

By performing the heat treatment step at such high temperature, the followings can be achieved. (1) an effect to increase the ratio of rutile phase in the carrier powder; (2) an effect to achieve strong fusion of the metal fine particles 130 with the carrier fine particles 150; (3) an effect to form a noble metal skin layer on the metal fine particles 130 by the migration of a part of the noble metal in the colloidal particles to the surface of the metal fine particles 130, when the colloidal particles contains colloidal particles of an alloy of noble metal and transition metal.

The mechanism of how the effect of the afore-mentioned (3) can be achieved is not revealed, however, it is presumed that the Ti atom of the carrier fine particles 150 migrate to the metal fine particles 130 during the heat treatment, thereby increasing the Ti density in the metal fine particles 130, resulting in precipitation of noble metal atoms at the surface of the alloy. In the conventional technique, a plurality of steps were required to form a core-shell structure having an alloy core and a noble metal shell. In the present invention, the core-shell structure can be formed merely by performing the heat treatment at 800° C. or higher. Therefore, elution of the transition metal can be suppressed.

Further, when an ordinary carbon support is used, aggregation and coarsening of the metal fine particles 130 would progress, and thus high catalyst activity cannot be obtained. On the other hand, in the present invention, the metal fine particles 130 are strongly fused with the carrier fine particles 150 during the heat treatment, and thus aggregation of the metal fine particles 130 is suppressed. Accordingly, high catalyst activity can be achieved.

<Reduction Step>

In the reduction step, reduction treatment of the metal fine particles 130 is carried out after the heat treatment step. The reduction treatment can be carried out by performing a heat treatment under a reductive atmosphere containing a reductive gas such as hydrogen.

The temperature of this heat treatment is, for example, 70 to 300° C., preferably 100 to 200° C. This temperature is, particularly for example, 70, 80, 90, 100, 110, 120, 130, 140, 150, 160, 170, 180, 190, 200, 250, or 300° C., and can be in the range between the two values exemplified herein.

The heat treatment time is, for example, 0.01 to 20 hours, preferably 0.1 to 5 hours. The heat treatment time is, particularly for example, 0.01, 0.05, 0.1, 0.5, 1, 2, 3, 4, 5, 6, 7, 8, 9, 10, 15, or 20 hours, and can be in the range between the two values exemplified herein.

When the reductive gas is hydrogen, the density thereof is, for example, 0.1 to 100 volume %, preferably 0.2 to 10 volume %, and more preferably 0.5 to 3 volume %. This density is, particularly for example, 0.1, 0.2, 0.5, 1, 1.5, 2, 2.5, 3, 10, or 100 volume %, and can be in the range between the two values exemplified herein.

The metal fine particles 130 after the heat treatment in the supporting step can be in an oxidized condition. In such case, the metal fine particles 130 may not show catalyst activity. The catalyst activity can be increased by reducing the metal fine particles 130.

EXAMPLES

The carrier metal catalyst was manufactured in accordance with the method described below, and various evaluations were performed.

1. Manufacture of Carrier Metal Catalyst 100

Example 1

(Manufacture of Carrier Powder)

By using the manufacturing apparatus 1 shown in FIG. 8 to FIG. 11, carrier powder was manufactured. As the burner gas 2a, gas prepared by blending 5 L/min of oxygen and 1 L/min of propane gas was used. This gas was ignited to form a flame (chemical flame) 7 of 1600° C. or higher at the tip of the burner 2. The raw material solution 23a was prepared by blending titanium octylate and tungsten octylate by a molar ratio of 0.95:0.05, and then the blend was further combined with mineral spirit terpen and dissolved. Oxygen was used as the mist gas 13a. 9 L/min of the mist gas 13a and 3 g/min of the raw material solution 23a were blended and sprayed from the tip of the raw material supplying unit 3 which is a spray nozzle (atomizer) towards the center portion of the flame, thereby allowing combustion of the blend and generation of the carrier powder which is an aggregate of the carrier fine particles 150. During such, negative pressure was applied to the gas discharging portion 5b to suction air from slit 6b at a flow rate of 170 L/min, thereby collecting the generated carrier powder in the collector 5 (with filter 5a). The raw material supplying unit 3 comprises a double tube structure (overall length of 322.3 mm). Oxygen is supplied from the outer cylinder 13, and the raw material solution 23a is supplied to the raw material distribution cylinder 23. At the tip of the raw material distribution cylinder 23, a fluid nozzle and an air nozzle are provided, and the raw material solution 23a was converted into the mist 23b at this position. The amount of the carrier powder collected was 10 g or more when the operation was carried out for 60 minutes.

(Support and Reduction of Metal Fine Particles 130)

Figure 12:
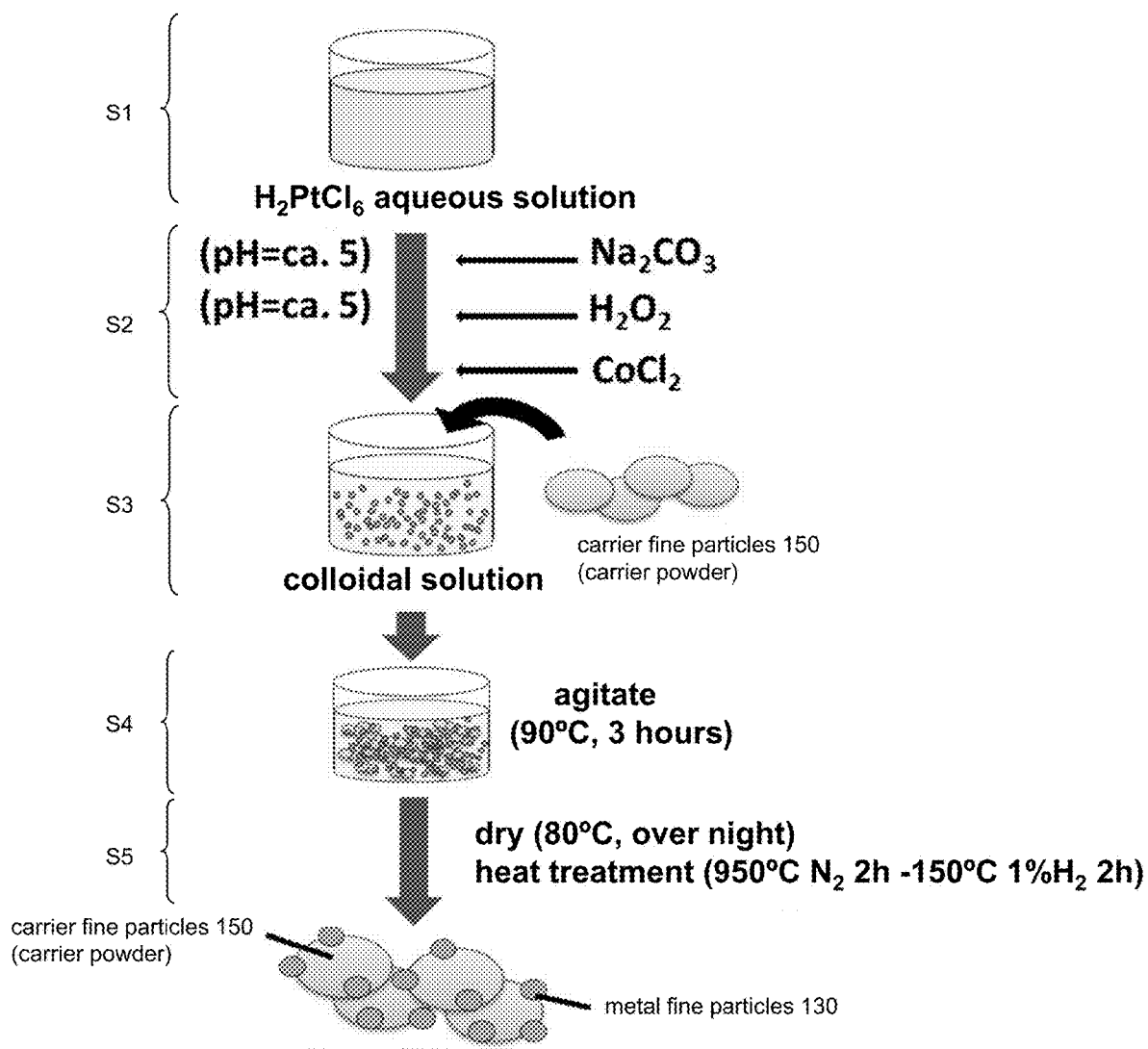
FIG. 12 is a flow of supporting and reduction step of metal fine particles 130.

In accordance with the procedures in FIG. 12, metal fine particles 130 were supported onto the carrier powder.

First, 0.57 mL of chloroplatinic acid hexahydrate aqueous solution was dissolved in 38 ml of super pure water, followed by addition of 1.76 g of sodium carbonate, and then the mixture was agitated (Step S1 in FIG. 12).

The solution was diluted with 150 ml of water, and pH of the solution was adjusted to 5 with NaOH. Thereafter, 25 ml of hydrogen peroxide was added, and the pH was again adjusted to 5 with NaOH. CoCl2 solution ($CoCl_2$ (available from KANTO CHEMICAL CO., INC.)/15 mL of super pure water) was added in a dropwise manner at 2 mL/min, and the solution was agitated (Step S2 in FIG. 12).

To the dispersion, a dispersion prepared by dispersing 0.50 g of carrier powder in 15 mL of super pure water was added (Step S3 in FIG. 12), and the mixture was agitated for 3 hours at 90° C. (Step S4 in FIG. 12). The mixture was cooled to room temperature, and was then filtered. The residue was washed with super pure water and alcohol, and was then dried overnight at 80° C. The residue was further subjected to 2 hours of heat treatment in nitrogen at 950° C., thereby allowing the metal fine particles 130 to be supported on the carrier powder. Then, heat treatment was performed for 2 hours in 1% hydrogen at 150° C. to reduce the metal fine particles 130 (Step S5 in FIG. 12). With these procedures, carrier metal catalyst 100 having metal fine particles 130 supported on carrier powder was obtained.

Example 2

Carrier metal catalyst 100 was manufactured with a similar procedure as Example 1 except that the heat treatment time in 1% hydrogen was altered from 2 hours to 10 minutes.

Example 3

Carrier metal catalyst 100 was manufactured with a similar procedure as Example 1 except that $CoCl_2$ solution was not added in Step S2 in FIG. 12.

Comparative Example 1

Figure 6A:
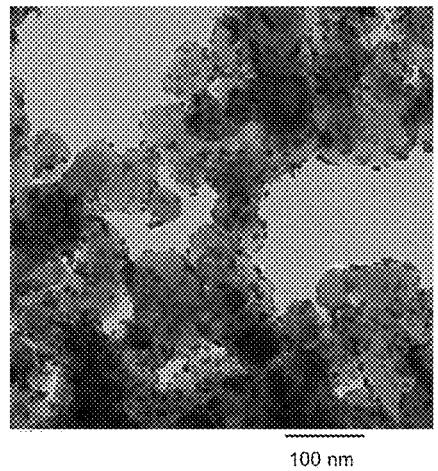
FIG. 6A is a TEM image of carrier metal catalyst 100 of Example 1.
Figure 6C:
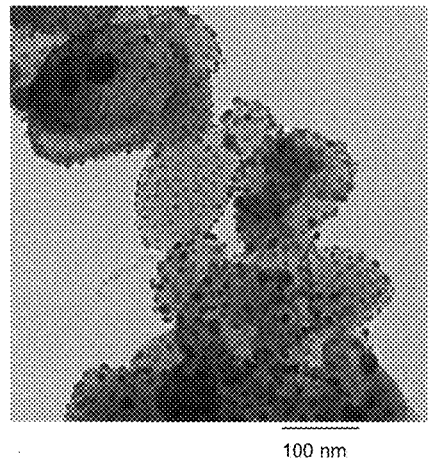
FIG. 6C is a TEM image of carrier metal catalyst 100 of Example 2.
Figure 6B:
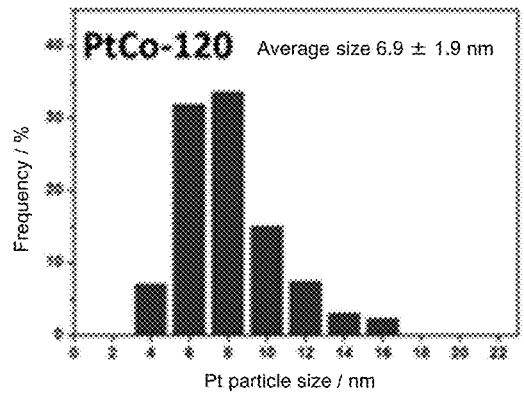
FIG. 6B is a particle size distribution of metal fine particles 130 of carrier metal catalyst 100 of Example 1.
Figure 6D:
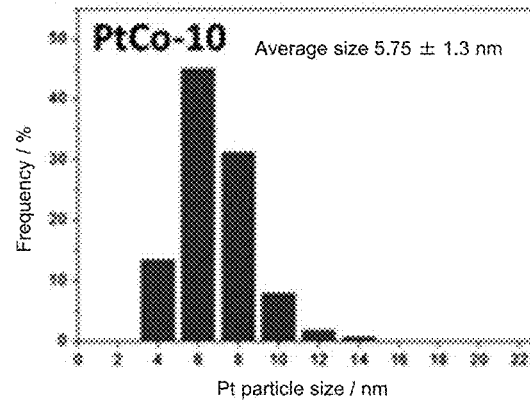
FIG. 6D is a particle size distribution of metal fine particles 130 of carrier metal catalyst 100 of Example 2.
Figure 13:
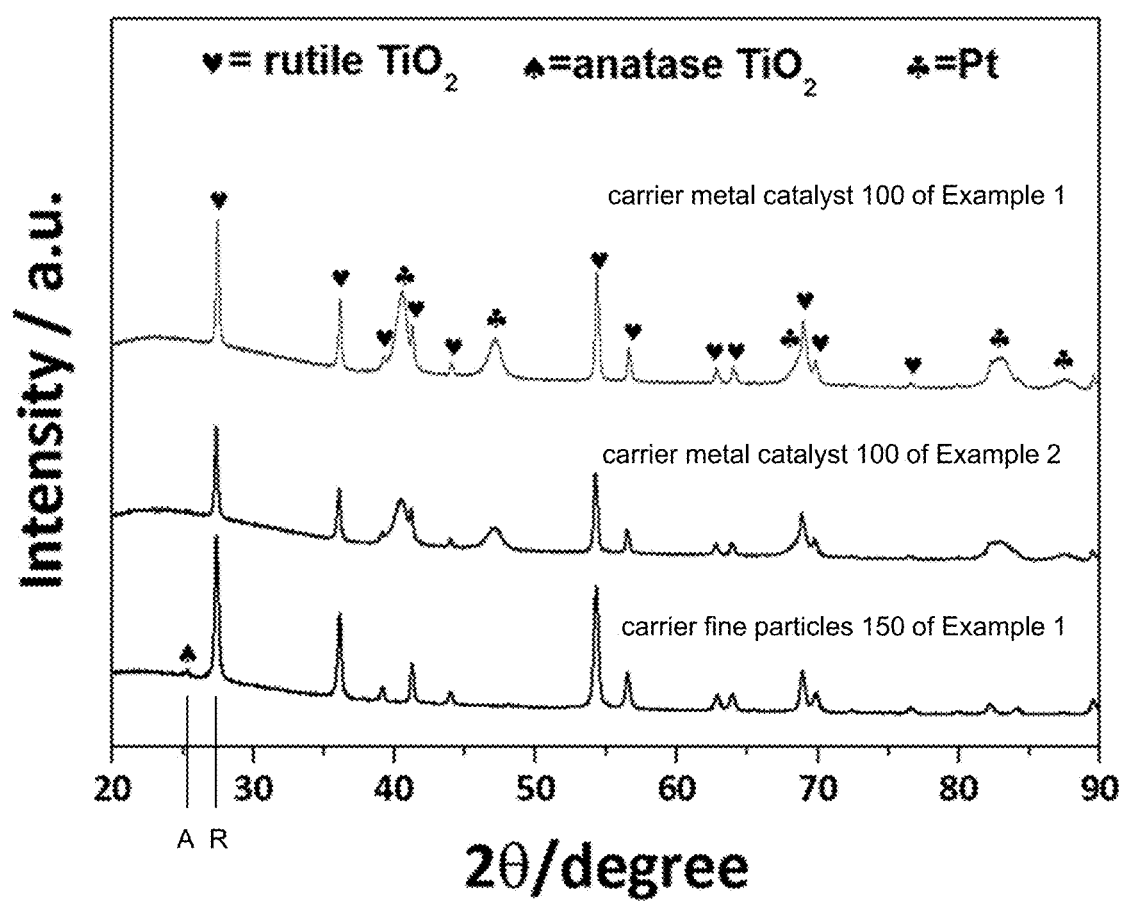
FIG. 13 is a XRD pattern of carrier powder of Example 1, and carrier metal catalyst 100 of Examples 1 and 2.

As Comparative Example 1, commercially available electrode catalyst (catalyst having platinum fine particles supported on carbon support) (type: TEC10E50E, available from Tanaka Kikinzoku Kogyo) was used.
2. Evaluation
<BET Specific Surface Area>
Specific surface area of the carrier powder of Example 1 was measured by BET, which turned out to be 27 $m^2/g$.
<XRD Pattern>
XRD pattern was measured for the carrier powder of Example 1, and the carrier metal catalyst 100 of Example 1 and 2. The results are shown in FIG. 13. As shown in FIG. 13, referring to peak A (2θ=25.16 degrees) derived from the anatase phase and peak R (2θ=27.24 degrees) derived from the rutile phase, the ratio of anatase phase/rutile phase of all the three samples were 0.2 or lower. In addition, in the carrier powder of Example 1, peak A derived from the anatase phase was slightly observed, while in the carrier metal catalyst 100 of Example 1 and 2, peak A was not observed at all. This result indicates that the anatase phase was converted into the rutile phase by the heat treatment performed when the metal fine particles 130 were being supported.
<Analysis by TEM Image>
TEM image of the carrier metal catalyst 100 of Examples 1 and 2 are shown in FIG. 6A and FIG. 6C, respectively. Further, diameter of the circumscribed circle of all the metal fine particles 130 in the TEM image of the carrier metal catalyst 100 shown in FIG. 6A and FIG. 6C were measured, and then the mean particle size of the metal fine particles 130 was calculated as their arithmetic mean. In Example 1, the mean particle size of the metal fine particles 130 was 6.9 nm, and the standard deviation was 1.9 nm. On the other hand, in Example 2, the mean particle size was 5.75 nm, and the standard deviation was 1.3 nm. Mean particle size was measured in a similar manner for Example 3 and Comparative Example 1. Results are shown in Table 1.
<Measurement of Amount of Pt Supported, Electrochemical Active Area of Catalyst, Mass Activity, and Specific Activity>
Measurement was performed for the amount of Pt supported, electrochemical active area of catalyst, mass activity, and specific activity, for Examples 1 to 3 and Comparative Example 1. These measurements were performed by ICP-MS and rotating disk electrode method. Results are shown in Table 1.

TABLE 1

| | mean particle size of metal fine particles (mm) | amount of Pt being supported (wt %) | electro-chemical active area of catalyst ($m^2/g$) | mass activity @0.85 V (A/g) | specific activity @ 0.85 V ($mA/cm^2$) |
|---|---|---|---|---|---|
| Example 1 | 6.9 | 15.4 | 39 | 570 | 1.5 |
| Example 2 | 5.75 | 15.4 | 45 | 393 | 0.9 |
| Example 3 | 4.7 | 14.7 | 36 | 236 | 0.7 |
| Comparative Example 1 | 2.2 | 47.9 | 80 | 517 | 0.7 |

Figure 14:
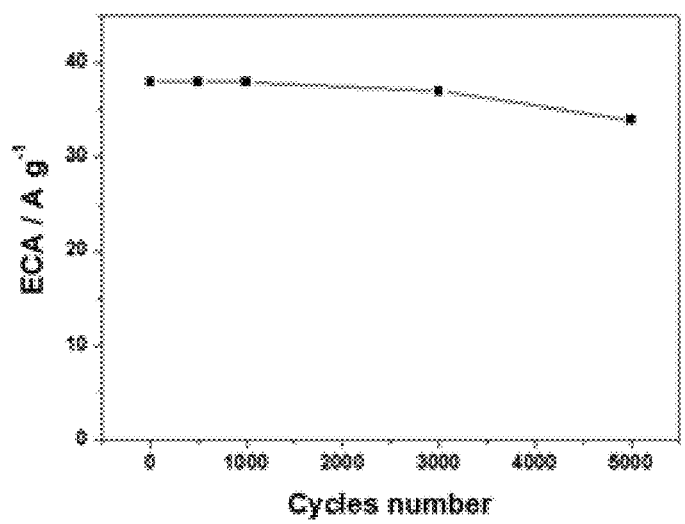
FIG. 14 is a graph showing a relation between the number of cycles and electrochemical active area (ECA) in an accelerated durability test.
Figure 16A:
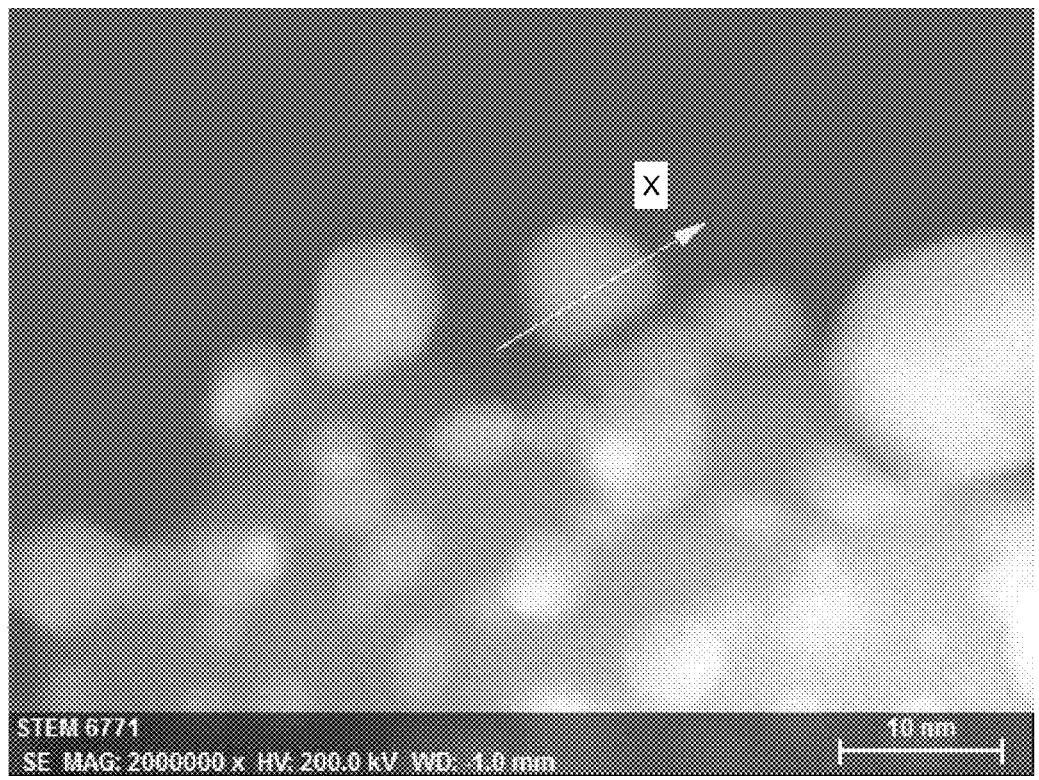
FIG. 16A is an enlarged view of carrier metal catalyst 100 of Example 1.
Figure 16B:
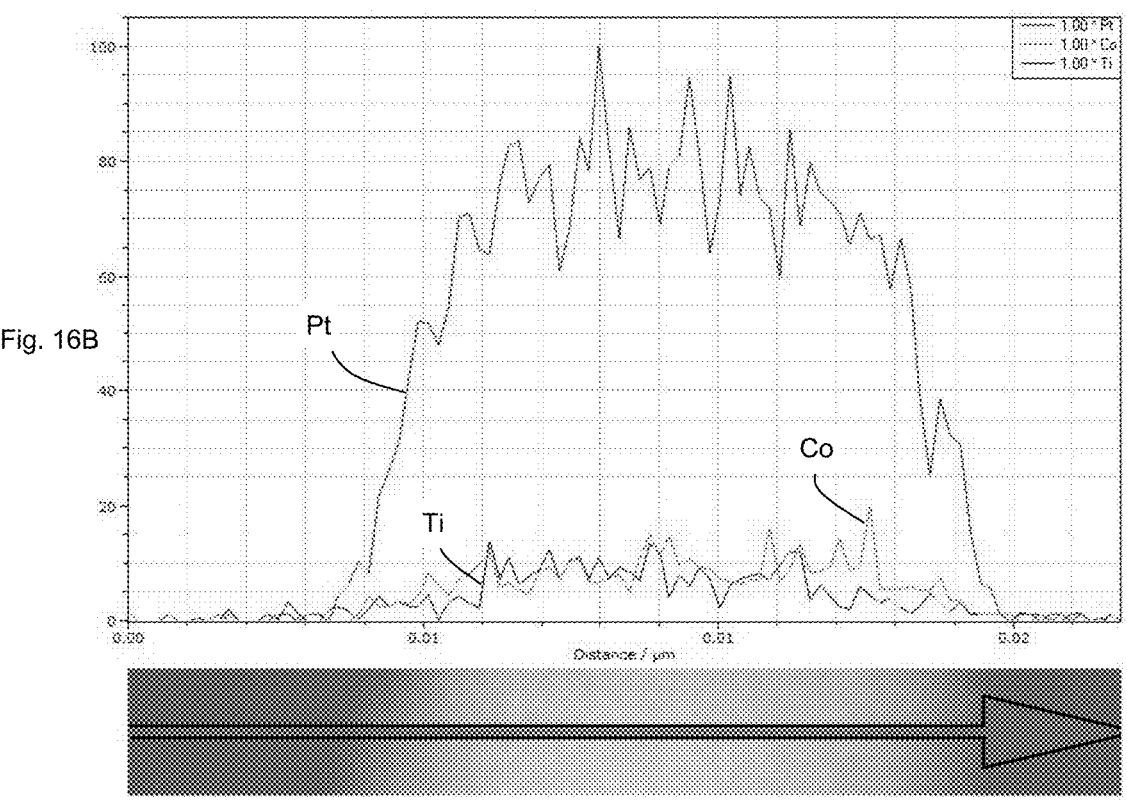
FIG. 16B is a graph showing the result of line analysis of STEM-EDX analyzed along the arrow X in FIG. 16A.
Figure 17:
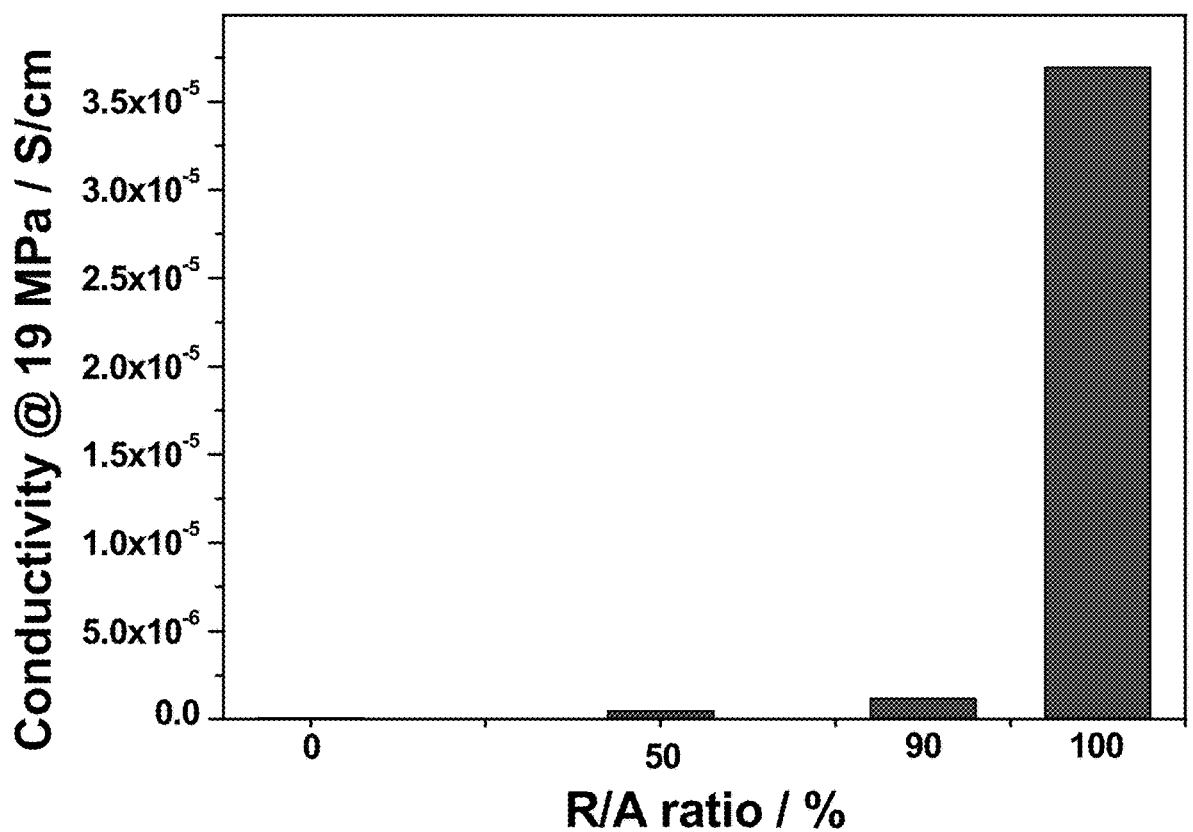
FIG. 17 is a graph showing the relation between the ratio of rutile phase/anatase phase (R/A ratio) and conductivity.

<Accelerated Durability Test>
Accelerated durability test was performed with the carrier metal catalyst 100 of Example 1, and the change in the electrochemical active area (ECA) was observed. The accelerated durability test was performed using a rotating disk electrode, in accordance with the accelerated durability test method (2011 version) recommended by the Fuel Cell Commercialization conference of Japan (FCCJ). The results are shown in FIG. 14. As shown in FIG. 14, the electrochemical active area hardly changed even after 5000 cycles of the test were performed.
When the TEM images of FIG. 6A and FIG. 15A are compared, and the particle size distribution of the metal fine particles 130 before and after the test as shown in FIG. 15B are referred, it can be understood that the distribution of the metal fine particles 130 hardly changed before and after the accelerated durability test.
<Confirmation of Pt Skin Layer>
FIG. 16A is an enlarged view of carrier metal catalyst 100 of Example 1. FIG. 16B is a graph showing the result of line analysis of STEM-EDX analyzed for the metal fine particles 130 along the arrow X in FIG. 16A. Referring to FIG. 16B, it can be understood that Co and Ti do not exist in the vicinity of the surface of the metal fine particles 130, and the surface is constituted almost from only Pt. This result shows that Pt skin layer was formed on the metal fine particles 130 by the heat treatment step. Further, this result shows that the amount of Ti dissolved is larger in the core than in the skin layer.
<Confirmation of Higher Conductivity Tendency in Rutile Titanium Oxide Than in Anatase Titanium Oxide>
FIG. 17 is a graph showing the relation between the ratio of rutile phase/anatase phase (R/A ratio) and conductivity. Titanium oxide having different ratio of rutile phase/anatase phase was prepared by altering the temperature of the heat treatment. Referring to FIG. 17, it can be understood that conductivity increases along with the increase of the ratio of the rutile phase.

EXPLANATION OF SYMBOLS

1: manufacturing apparatus, 2: burner, 2a: burner gas, 3: raw material supplying unit, 4: reaction cylinder, 5: collector, 5a: filter, 5b: gas discharging portion, 6: gas reservoir, 6a: cold gas introducing portion, 6b: slit, 6c: inner peripheral wall, 6d: burner insertion hole, 6g: cold gas, 7: flame, 13: outer cylinder, 13a: mis gas, 23: raw material distribution cylinder, 23a: raw material solution, 23b: mist, 100: carrier metal catalyst, 110: gap, 120: crystallite, 130: metal fine particles, 150: carrier fine particles, 160: branch, 200: solid polymer electrolyte fuel cell, 201: anode, 202: cathode, 203: load, 210A: gas diffusion layer on the anode side, 210L: gas diffusion layer on the cathode side, 220A: catalyst layer, 220A: catalyst layer on the anode side, 220K: catalyst layer on the cathode side, 230: electrolyte membrane, A: peak derived from anatase phase, R: peak derived from rutile phase

The invention claimed is:

1. A carrier metal catalyst comprising:
a carrier powder; and
metal fine particles supported on the carrier powder; wherein: the carrier powder is an aggregate of carrier fine particles;
the carrier fine particles comprise a chained portion structured by fusion bonding a plurality of crystallites into a chain;
the carrier fine particles contain titanium oxide;
a ratio of anatase phase/rutile phase of the titanium oxide of the carrier powder is 0.2 or lower;
the metal fine particles comprise a core and a skin layer covering the core; the core comprises an alloy of a noble metal and a transition metal;
the skin layer is platinum; and
Ti atom of the carrier fine particles migrate to the metal fine particles during heat treatment, and an amount of titanium dissolved in the core is larger than an amount of titanium dissolved in the skin layer.

2. The carrier metal catalyst of claim 1, wherein the crystallites have a size of 1 to 30 nm.

3. The carrier metal catalyst of claim 1, wherein the carrier powder has a specific surface area of 12 $m^2/g$ or more.

4. The carrier metal catalyst of claim 1, wherein:
the chained portion comprises a plurality of branches, pores existing in between the plurality of branches, and gaps; and
the gap is surrounded by the plurality of branches and the pores.

5. The carrier metal catalyst of claim 4, wherein the gaps comprise a gap having a sphere equivalent diameter obtained by mercury press-in method of 11 nm or less and a gap having a sphere equivalent diameter obtained by mercury press-in method of larger than 11 nm.

6. The carrier metal catalyst of claim 1, wherein the carrier powder has a porosity of 50% or more.

7. The carrier metal catalyst of claim 1, wherein the carrier powder has a repose angle of 50 degrees or less.

8. The carrier metal catalyst of claim 1, wherein the carrier fine particles are doped with an element having a valence different from a valence of titanium.

9. The carrier metal catalyst of claim 1, wherein the carrier powder has a conductivity of 0.001 S/cm or more.

10. A fuel cell comprising a carrier metal catalyst of claim 1.

11. A method for manufacturing a carrier powder, comprising a carrier powder generating step to generate the carrier powder which is an aggregate of carrier fine particles by performing a thermal decomposition reaction of a titanium compound in a high temperature region of 1000° C. or higher; wherein:
the carrier powder generating step is performed while supplying a cold gas to a surrounding of the high temperature region via a slit provided in a cylinder gas reservoir;
the gas reservoir comprises a cold gas introducing portion to introduce the cold gas into the gas reservoir; and
the cold gas introducing portion is structured so as to allow the cold gas introduced into the gas reservoir via the cold gas introducing portion to revolve along an inner peripheral wall of the gas reservoir in the gas reservoir,
wherein the high temperature region is formed by a flame formed at a tip of a burner, and
wherein a flow rate of the cold gas is twice or more of a flow rate of a burner gas for forming the flame.

12. The method of claim 11, wherein the slit is provided so as to surround the burner.

13. The method of claim 11, wherein:
the titanium compound is contained in a raw material solution; and
the raw material solution is converted into a mist and introduced into the flame.

14. The method of claim 13, wherein the raw material solution has a water content of 100 ppm or lower.

15. A method for manufacturing a carrier metal catalyst, comprising: a supporting step to allow metal fine particles to be supported on a carrier powder; wherein:
the supporting step comprises an adsorption step and a heat treatment step;
the adsorption step includes allowing metal colloidal particles to be supported on the carrier powder;
the heat treatment step includes performing a heat treatment at 800° C. or higher after the adsorption step, thereby converting the metal colloidal particles into the metal fine particles; and
the carrier powder is formed by the method of claim 11.

16. The method of claim 15, wherein:
the metal colloidal particles comprise an alloy of a noble metal and a transition metal; and
the heat treatment step includes migration of a part of the noble metal in the colloidal particles to a surface of the metal fine particles, thereby allowing formation of a skin layer of the noble metal on the metal fine particles.

17. The method of claim 15, further comprising a reduction step after the heat treatment step to perform a reduction treatment of the metal fine particles.

* * * * *